US011076316B2

(12) United States Patent
Dai et al.

(10) Patent No.: US 11,076,316 B2
(45) Date of Patent: Jul. 27, 2021

(54) WIRELESS COMMUNICATION METHOD AND DEVICE

(71) Applicant: HUAWEI TECHNOLOGIES CO., LTD., Guangdong (CN)

(72) Inventors: Shengchen Dai, Hangzhou (CN); Rong Li, Hangzhou (CN); Chaolong Zhang, Hangzhou (CN); Lingchen Huang, Hangzhou (CN); Hejia Luo, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 16/566,500

(22) Filed: Sep. 10, 2019

(65) Prior Publication Data
US 2020/0008096 A1 Jan. 2, 2020

Related U.S. Application Data

(63) Continuation of application No. PCT/CN2018/078619, filed on Mar. 9, 2018.

(30) Foreign Application Priority Data

Mar. 10, 2017 (CN) .......................... 201710144385.2

(51) Int. Cl.
H04L 1/00 (2006.01)
H04W 28/04 (2009.01)
(Continued)

(52) U.S. Cl.
CPC ............ H04W 28/04 (2013.01); H04L 1/001 (2013.01); H04L 27/2607 (2013.01); H04W 72/042 (2013.01)

(58) Field of Classification Search
CPC ... H04W 28/04; H04W 72/042; H04W 72/12; H04L 1/001; H04L 27/2607; H04L 1/06; H04L 1/0061; H04L 1/0041; H04L 1/0045
See application file for complete search history.

(56) References Cited

U.S. PATENT DOCUMENTS

2010/0034161 A1 2/2010 Luo et al.
2011/0271169 A1 11/2011 Pi
(Continued)

FOREIGN PATENT DOCUMENTS

CN 101594205 A 12/2009
CN 102056198 A 5/2011
(Continued)

OTHER PUBLICATIONS

3GPP TS 36.212 V14.1.1 (Jan. 2017), "3rd Generation Partnership Project; Technical Specification Group Radio Access Network; Evolved Universal Terrestrial Radio Access (E-UTRA); Multiplexing and channel coding (Release 14)," Jan. 2017, 149 pages.
(Continued)

Primary Examiner — Christopher M Brandt
(74) Attorney, Agent, or Firm — Fish & Richardson P.C.

(57) ABSTRACT

This application provides a wireless communication method and device. The method includes: scrambling, with each piece of configuration information of a plurality of pieces of configuration information for configuring a terminal device, bits that are included in a cyclic redundancy check (CRC) of downlink control information (DCI) and that correspond to each piece of configuration information, to obtain a scrambled sequence, where at least one bit of bits that correspond to each piece of configuration information does not correspond to another piece of configuration information of the plurality of pieces of configuration information; and
(Continued)

sending the DCI and the scrambled sequence to the terminal device.

15 Claims, 8 Drawing Sheets

(51) Int. Cl.
*H04L 27/26* (2006.01)
*H04W 72/04* (2009.01)

(56) References Cited

U.S. PATENT DOCUMENTS

| | | |
|---|---|---|
| 2012/0201216 A1 | 8/2012 | Wu |
| 2013/0201932 A1 | 8/2013 | Ko et al. |
| 2014/0119266 A1 | 5/2014 | Ng et al. |
| 2014/0173376 A1* | 6/2014 | Jeong .................. H04L 1/0041 714/755 |
| 2016/0182187 A1 | 6/2016 | Kim et al. |
| 2018/0167129 A1 | 6/2018 | Aiba et al. |
| 2019/0149176 A1* | 5/2019 | Hui ..................... H03M 13/13 714/790 |

FOREIGN PATENT DOCUMENTS

| | | | |
|---|---|---|---|
| CN | 102113403 A | 6/2011 | |
| CN | 103138885 A | 6/2013 | |
| CN | 104770039 A | 7/2015 | |
| EP | 3316615 A1 * | 5/2018 | ........... H04L 5/0053 |
| WO | 2011135916 A1 | 11/2011 | |
| WO | 2017002794 A1 | 1/2017 | |

OTHER PUBLICATIONS

Arikan, "Channel Polarization: A Method for Constructing Capacity-Achieving Codes for Symmetric Binary-Input Memoryless Channels," IEEE Transactions on Information Theory, vol. 55, No. 7, Jul. 2009, 23 pages.
Hao Ye, "Research on Algorithms of Encoding and Decoding for Polar Codes," Master Thesis, Beijing University of Posts and Telecommunications, Mar. 8, 2017, 82 pages (with English translation).
Office Action issued in Chinese Application No. 201910407375.2 dated Dec. 23, 2019, 11 pages (with English translation).
Office Action issued in Chinese Application No. 201910407375.2 dated Mar. 23, 2020 11 pages (with English translation).
PCT International Search Report and Written Opinion issued in International Application No. PCT/CN2018/078619 dated May 18, 2018, 17 pages (with English translation).
Motorola, "UE Transmit Antenna Selection," 3GPP TSG-RAN WG1#53, R1-082109, Kansas City, MO, USA, May 5-9, 2008, 1 page.
Office Action issued in Japanese Application No. 2019-549440 dated Nov. 16, 2020, 24 pages (with English translation).

* cited by examiner

WIRELESS COMMUNICATION METHOD AND DEVICE

CROSS-REFERENCE TO RELATED APPLICATIONS

This application is a continuation of International Application No. PCT/CN2018/078619, filed on Mar. 9, 2018, which claims priority to Chinese Patent Application No. 201710144385.2, filed on Mar. 10, 2017. The disclosures of the aforementioned patent applications are hereby incorporated by reference in their entireties.

TECHNICAL FIELD

This application relates to the communications field, and more specifically, to a wireless communication method and device.

BACKGROUND

In a Long Term Evolution (Long Term Evolution, LTE) communications system, a terminal device sends uplink data and receives downlink data based on scheduling by a base station. To be specific, before sending data or receiving data, the terminal device usually receives downlink control information (Downlink Control Information, DCI) sent by the base station, and then performs a corresponding data sending or receiving operation based on the DCI.

When sending the DCI, the base station may scramble a cyclic redundancy check (Cyclic Redundancy Check, CRC) of the DCI with configuration information used for configuring the terminal device, and send a scrambled sequence and the DCI together to the terminal device. The terminal device may obtain configuration information of a network device from the scrambled sequence, so as to implement communication with a network.

In a process in which the terminal device descrambles the scrambled sequence, a descrambling error may occur. As a result, the terminal device obtains incorrect configuration information. Therefore, how to reduce a probability that the terminal device obtains incorrect configuration information is a problem to be resolved urgently.

SUMMARY

This application provides a wireless communication method and device, so as to reduce a probability that a terminal device obtains incorrect configuration information.

A first aspect provides a wireless communication method, including:

scrambling, with each piece of configuration information of a plurality of pieces of configuration information used for configuring a terminal device, bits that are included in a cyclic redundancy check CRC of downlink control information DCI and that correspond to each piece of configuration information, to obtain a scrambled sequence, where at least one bit of bits that correspond to each piece of configuration information does not correspond to another piece of configuration information of the plurality of pieces of configuration information; and sending the DCI and the scrambled sequence to the terminal device.

Therefore, the bits that are included in the cyclic redundancy check CRC of the downlink control information DCI and that correspond to each piece of configuration information are scrambled with each piece of configuration information of the plurality of pieces of configuration information used for configuring the terminal device, to obtain the scrambled sequence, where the at least one bit of the bits that correspond to each piece of configuration information does not correspond to another piece of configuration information of the plurality of pieces of configuration information. Compared with a case in which each bit corresponding to at least one piece of configuration information corresponds to another piece of configuration information, a probability that the terminal device obtains incorrect configuration information through descrambling can be reduced.

In an implementation, when a sum of quantities of bits corresponding to the plurality of pieces of configuration information is greater than or equal to a total quantity of bits included in the CRC, each bit in the CRC corresponds to at least one piece of configuration information.

Therefore, in this implementation, when a sum of quantities of bits that need to be scrambled with the plurality of pieces of configuration information is greater than or equal to a total length of the CRC, each bit in the CRC may be scrambled with configuration information. In this way, if the CRC has a limited length, a proportion of overlapping scrambling performed by using configuration information can be minimized, so that a probability that the terminal device incorrectly descrambles configuration information can be reduced.

In an implementation, when a sum of quantities of bits corresponding to the plurality of pieces of configuration information is less than a total quantity of bits included in the CRC, each bit in the CRC corresponds to at most one piece of configuration information.

Therefore, in this implementation, when a sum of quantities of bits that need to be scrambled with the plurality of pieces of configuration information is less than a total length of the CRC, the CRC may be scrambled with the plurality of pieces of configuration information in a non-overlapping manner, so that a probability of incorrect descrambling can further be reduced.

In an implementation, the plurality of pieces of configuration information include first configuration information and second configuration information, the first configuration information corresponds to M first bits in the CRC, and the second configuration information corresponds to N second bits in the CRC; and the scrambling, with each piece of configuration information of a plurality of pieces of configuration information used for configuring a terminal device, bits, corresponding to each piece of configuration information, of bits included in a CRC of DCI includes:

scrambling the M first bits with the first configuration information, and scrambling the N second bits with the second configuration information.

In an implementation, the first configuration information is used to indicate a radio network temporary identifier RNTI configured for the terminal device.

In an implementation, the second configuration information is used to indicate an antenna port configured for the terminal device for communication.

In an implementation, the scrambling the N second bits with the second configuration information includes:

determining a first scrambled sequence based on the antenna port configured for the terminal device for communication and a mapping relationship between a plurality of antenna ports and a plurality of scrambled sequences; and scrambling the N second bits with the first scrambled sequence.

In an implementation, the scrambling the M first bits with the first configuration information, and scrambling the N second bits with the second configuration information includes:

determining a second scrambled sequence based on the first configuration information and the second configuration information, where a length of the second scrambled sequence is equal to a length occupied by the M first bits and the N second bits in the CRC, the second scrambled sequence includes M third bits and N fourth bits, the M third bits carry the first configuration information, and the N fourth bits carry the second configuration information; and scrambling the CRC with the second scrambled sequence.

In an implementation, the scrambling the M first bits with the first configuration information, and scrambling the N second bits with the second configuration information includes:

determining a third scrambled sequence based on the first configuration information, where the third scrambled sequence includes M fifth bits;

scrambling the M first bits with the third scrambled sequence;

determining a fourth scrambled sequence based on the second configuration information, where the fourth scrambled sequence includes N sixth bits; and scrambling the N second bits with the fourth scrambled sequence.

In an implementation, a quantity of bits included in the third scrambled sequence is greater than M, and a length of the third scrambled sequence is equal to a length of the CRC. Optionally, a value of a bit other than the M first bits in the third scrambled sequence is 0.

In an implementation, a quantity of bits included in the fourth scrambled sequence is greater than N, and a length of the fourth scrambled sequence is equal to a length of the CRC. Optionally, a value of a bit other than the N second bits in the fourth scrambled sequence is 0. In an implementation, the bits that correspond to each piece of configuration information are consecutive bits.

In an implementation, if bits corresponding to various configuration information are consecutive bits, there may be a separating dummy bit (that is, a bit that does not need to be scrambled with configuration information) or there may be no separating bit between bits corresponding to two adjacent pieces of configuration information.

In an implementation, bits corresponding to the plurality of pieces of configuration information may be interleaved. When the bits are interleaved, there may be a separating dummy bit or there may be no separating dummy bit between the bits.

In an implementation, the sending the DCI and the scrambled sequence to the terminal device includes:

performing polar coding on the DCI and the scrambled sequence, to obtain coded bits; and sending the coded bits to the terminal device.

A second aspect provides a wireless communication method, including:

obtaining downlink control information DCI and a scrambled sequence that are sent by a network device, where bits corresponding to the scrambled sequence are scrambled with each piece of configuration information of a plurality of pieces of configuration information used for configuring a terminal device by the network device, each piece of configuration information corresponds to at least one bit in the scrambled sequence, and at least one bit of the bits that correspond to each piece of configuration information does not correspond to another piece of configuration information of the plurality of pieces of configuration information;

descrambling, based on a possible value of each piece of configuration information, the bits that correspond to each piece of configuration information, to obtain a descrambled sequence; and performing a check operation by using the descrambled sequence and the DCI.

In an implementation, when a sum of quantities of bits corresponding to the plurality of pieces of configuration information is greater than or equal to a total quantity of bits included in the scrambled sequence, each bit in the scrambled sequence corresponds to at least one piece of configuration information; or when a sum of quantities of bits corresponding to the plurality of pieces of configuration information is less than a total quantity of bits included in the scrambled sequence, each bit in the scrambled sequence corresponds to at most one piece of configuration information.

In an implementation, the plurality of pieces of configuration information include first configuration information and second configuration information, where the first configuration information corresponds to M first bits in the scrambled sequence, and the second configuration information corresponds to N second bits in the scrambled sequence; and the descrambling, based on a possible value of each piece of configuration information, the bits that correspond to each piece of configuration information includes:

descrambling the M first bits based on a possible value of the first configuration information, and descrambling the N second bits based on a possible value of the second configuration information.

In an implementation, the first configuration information is used to indicate a radio network temporary identifier RNTI configured for the terminal device by the network device.

In an implementation, the second configuration information is used to indicate an antenna port configured for the terminal device by the network device for communication.

In an implementation, the descrambling the N second bits based on a possible value of the second configuration information includes:

determining a first descrambled sequence based on an antenna port possibly configured for the terminal device by the network device for communication and a mapping relationship between a plurality of antenna ports and a plurality of scrambled sequences; and descrambling the N second bits by using the first descrambled sequence.

In an implementation, the descrambling the M first bits based on a possible value of the first configuration information, and descrambling the N second bits based on a possible value of the second configuration information includes:

determining a second descrambled sequence based on a possible value of the first configuration information and a possible value of the second configuration information, where a length of the second descrambled sequence is equal to a length occupied by the M first bits and the N second bits in the scrambled sequence, the second descrambled sequence includes M third bits and N fourth bits, the M third bits carry a possible value of the first configuration information, and the N fourth bits carry a possible value of the second configuration information; and descrambling the scrambled sequence by using the second descrambled sequence.

In an implementation, the descrambling the M first bits based on a possible value of the first configuration information, and descrambling the N second bits based on a possible value of the second configuration information includes:

determining a third descrambled sequence based on a possible value of the first configuration information, where the third descrambled sequence includes M fifth bits;

descrambling the M first bits by using the third descrambled sequence;

determining a fourth descrambled sequence based on a possible value of the second configuration information, where the fourth descrambled sequence includes N sixth bits; and descrambling the N second bits by using the fourth descrambled sequence.

In an implementation, a quantity of bits included in the third descrambled sequence is greater than M, and a length of the third descrambled sequence is equal to a length of the CRC. Optionally, a value of a bit other than the M first bits in the third descrambled sequence is 0.

In an implementation, a quantity of bits included in the fourth descrambled sequence is greater than N, and a length of the fourth descrambled sequence is equal to a length of the CRC. Optionally, a value of a bit other than the N second bits in the fourth descrambled sequence is 0. In an implementation, the bits that correspond to each piece of configuration information are consecutive bits.

In an implementation, the obtaining downlink control information DCI and a scrambled sequence that are sent by a network device includes:

obtaining a received signal; and performing SCL decoding on the received signal, to obtain the DCI and the scrambled sequence.

A third aspect provides a wireless communications device, including units configured to perform the steps in the method in the first aspect and the implementations of the first aspect.

A fourth aspect provides a wireless communications device, including units configured to perform the steps in the method in the second aspect and the implementations of the second aspect.

A fifth aspect provides a wireless communications device, including a memory and a processor. The memory is configured to store a computer program. The processor is configured to invoke the computer program from the memory and run the computer program, so that a device for transmitting control information performs the method in the first aspect and any possible implementation of the first aspect.

A sixth aspect provides a wireless communications device, including a memory and a processor. The memory is configured to store a computer program. The processor is configured to invoke the computer program from the memory and run the computer program, so that a device for transmitting control information performs the method in the second aspect and any possible implementation of the second aspect.

A seventh aspect provides a computer program product. The computer program product includes computer program code. When the computer program code is executed by a communications unit and a processing unit, or a transceiver and a processor of a terminal device, a network device performs the method in the first aspect or any possible implementation of the first aspect.

An eighth aspect provides a computer program product. The computer program product includes computer program code. When the computer program code is executed by a communications unit and a processing unit, or a transceiver and a processor of a network device, a terminal device performs the method in the second aspect or any possible implementation of the second aspect.

A ninth aspect provides a computer readable storage medium. The computer readable storage medium stores a program. The program enables a network device to perform the method in the first aspect or any possible implementation of the first aspect.

A tenth aspect provides a computer readable storage medium. The computer readable storage medium stores a program. The program enables a terminal device to perform the method in the second aspect or any possible implementation of the second aspect.

DESCRIPTION OF EMBODIMENTS

The following describes the technical solutions in this application with reference to the accompanying drawings.

Figure 1:
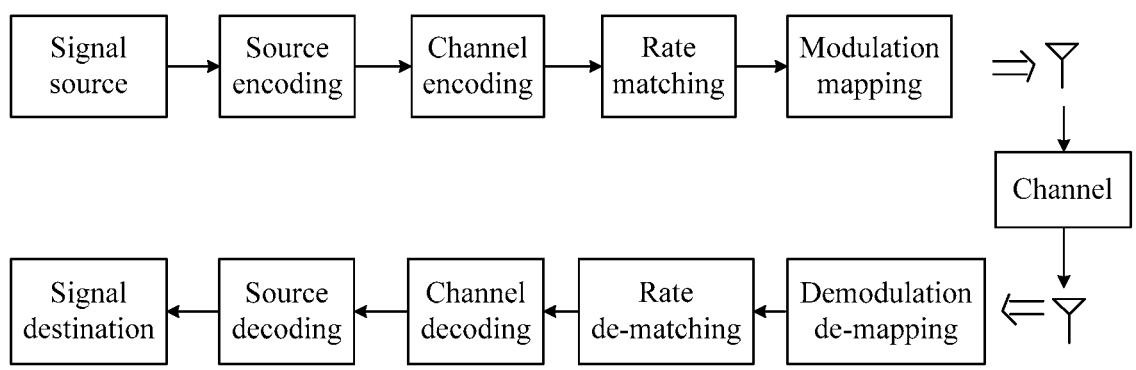
FIG. 1 shows a diagram of a basic procedure of wireless communication.

FIG. 1 shows a basic procedure of wireless communication. In a wireless communications system, at a transmit end, a signal is sent from a signal source after having successively undergone source encoding, channel encoding, rate matching, and modulation mapping.

At a receive end, a signal is output to a signal destination after having successively undergone demodulation de-mapping, rate de-matching, channel decoding, and source decoding.

It should be noted that a wireless communications system to which a wireless communication method in embodiments of this application is applicable may include but is not limited to: a Narrowband Internet of Things (Narrow Band-Internet of Things, NB-IoT) system, the Global System for Mobile Communications (Global System for Mobile Communications, GSM), Enhanced Data Rates for GSM Evolution (Enhanced Data Rates for GSM Evolution, EDGE), a Wideband Code Division Multiple Access (Wideband Code Division Multiple Access, WCDMA) system, a Code Division Multiple Access 2000 (Code Division Multiple Access 2000, CDMA2000) system, a Time Division-Synchronous Code Division Multiple Access (Time Division-Synchronous Code Division Multiple Access, TD-SCDMA) system, a Long Term Evolution (Long Term Evolution, LTE) system, and a next-generation communications system, for example, a 5th generation (5th Generation, 5G) communications system.

Three main categories of scenarios that are defined in the 5G communications system and more subsequent possible communications systems are: enhanced mobile broadband (enhanced Mobile Broadband, eMBB), ultra-reliable and low latency communications (Ultra Reliable Low Latency Communications, URLLC), and massive machine type communications (massive Machine Type Communications, mMTC). eMBB services mainly include ultra high definition videos, augmented reality AR, virtual reality VR, and the like, and have main characteristics of a large amount of data for transmission and a very high transmission rate. URLLC services are mainly applied to industrial control, automated driving, and the like in the Internet of Things, and have main characteristics of ultra-high reliability, a low latency, a relatively small amount of data for transmission, and burstiness. mMTC services are mainly applied to smart grids, smart cities, and the like in the Internet of Things, and have main characteristics of massive device connections, a small amount of data for transmission, and tolerance of a relatively long latency.

Figure 2:
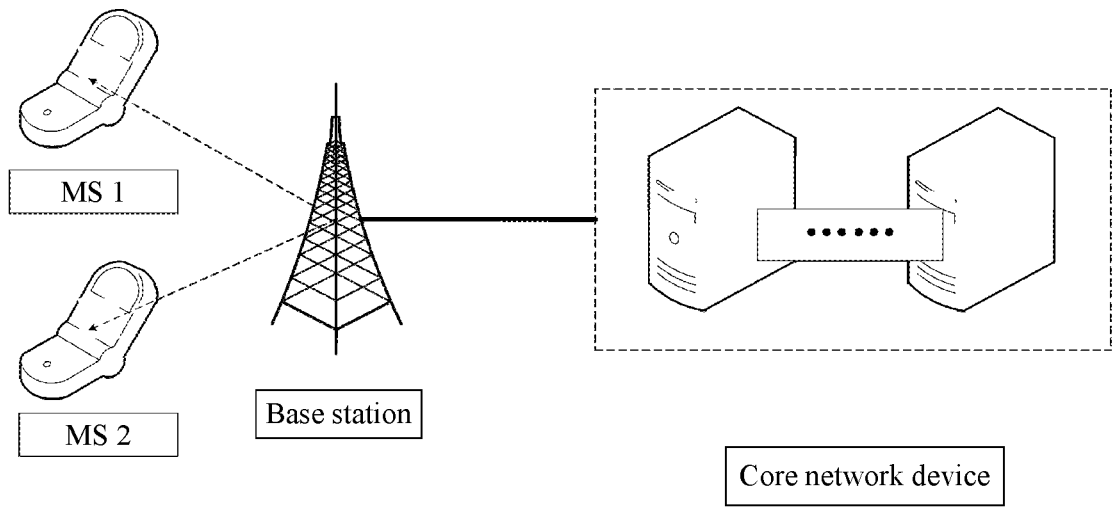
FIG. 2 is a diagram of an application scenario according to an embodiment of this application.

The embodiments of this application may be applied to a wireless communications system. The wireless communications system usually includes cells. Each cell includes one network device, for example, a base station (Base Station, BS). The base station provides communication services for a plurality of terminal devices, for example, mobile stations (Mobile Station, MS). The base station is connected to a core network device, as shown in FIG. 2.

In the embodiments of this application, the network device may include a baseband unit (Baseband Unit, BBU) and a remote radio unit (Remote Radio Unit, RRU). The BBU and the RRU may be placed in different locations. For example, the RRU is remotely placed in an open area with heavy telephone traffic. The BBU is placed in a central equipment room. Alternatively, the BBU and the RRU may be placed in a same equipment room. Alternatively, the BBU and the RRU may be different parts in a rack.

In the embodiments of this application, the network device is an apparatus deployed in a radio access network and configured to provide a wireless communication function for a terminal device. The base station may include various forms of macro base stations, micro base stations (also referred to as small cells), relay nodes, access points, and the like. A device having functions of a base station may have different names in systems using different radio access technologies. For example, the network device may be an access point (access point, AP) in a WLAN, or the network device may be a base transceiver station (Base Transceiver Station, BTS) in GSM or CDMA, or the network device may be an evolved NodeB (evolved NodeB, eNB or eNodeB) in an LTE system, or the network device may be a NodeB (Node B) in a 3rd generation (3rd Generation, 3G) system. In addition, the network device may be a relay node, an access point, an in-vehicle device, a wearable device, a network device in a future 5G network, a network device in a future evolved PLMN network, or the like. For ease of description, in all the embodiments of this application, the foregoing apparatuses that provide a wireless communication function for an MS are collectively referred to as a network device (for example, a base station or a BS).

The embodiments are described with reference to a terminal device in this application. The terminal device may also be referred to as user equipment (User Equipment, UE) user equipment, an access terminal, a subscriber unit (subscriber unit), a user station, a mobile console, a mobile station (Mobile Station, MS), a remote station, a remote terminal, a mobile device, a user terminal, a terminal (Terminal), a wireless communications device, a user agent, or a user apparatus.

As an example rather than a limitation, the terminal device used in the embodiments of this application may include various handheld devices, in-vehicle devices, wearable devices, or computing devices having a wireless communication function or other processing devices connected to a wireless modem, and may further include a subscriber unit, a cellular phone (cellular phone), a smartphone (smart phone), a wireless data card, a personal digital assistant (Personal Digital Assistant, PDA), a tablet computer, a wireless modem (modem), a handheld device (handset), a laptop computer (laptop computer), a machine type communication (Machine Type Communication, MTC) terminal, and a station (station, STA) in a wireless local area network (Wireless Local Area Network, WLAN). The terminal device may be a cellular phone, a cordless phone, a Session Initiation Protocol (Session Initiation Protocol, SIP) phone, a Wireless Local Loop (Wireless Local Loop, WLL) station, a terminal device in a next-generation communications system such as a 5th generation communication (fifth-generation, 5G) network, a terminal device in a future evolved Public Land Mobile Network (Public Land Mobile Network, PLMN), or the like.

The wearable device may also be referred to as a wearable intelligent device, and is a general term for wearable devices such as glasses, gloves, watches, clothes, and shoes that are intelligently designed and developed based on everyday wearables by applying a wearable technology. The wearable device is a portable device that is directly worn on the body or integrated in clothes or accessories of a user. The wearable device not only is a hardware device, but also implements powerful functions by using software support, data exchange, and cloud interaction. In a broad sense, wearable intelligent devices include smartwatches, smart glasses, or the like that are all-rounded, large-sized, and capable of implementing all or some of functions without relying on smartphones, and include various smart bands, smart jewelry, or the like that specialize in only one type of application function, for example, physical sign monitoring, and that need to be used together with other devices such as smartphones.

In addition, in the embodiments of this application, the terminal device may perform wireless communication in a cell. The cell may be a cell corresponding to a network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), or the like. These small cells have characteristics of small coverage areas and low transmit powers, and are suitable for providing high-rate data transmission services.

In addition, in the embodiments of this application, a plurality of cells may work at a same frequency on a carrier at the same time. In some special scenarios, it may be considered that concepts of a carrier and a cell are equivalent in a system such as LTE. For example, in a scenario of carrier aggregation (CA, Carrier Aggregation), when a supplementary carrier is configured for UE, the supplementary carrier carries both a carrier index of the supplementary carrier and a cell identity (Cell Identity, Cell ID) of a secondary serving cell working on the supplementary carrier. In this case, it may be considered that the concepts of a carrier and a cell are equivalent. For example, accessing a carrier by UE is equivalent to accessing a cell by the UE.

The method and apparatus provided in the embodiments of this application may be applied to a terminal device or a network device. The terminal device or the network device includes a hardware layer, an operating system layer running on the hardware layer, and an application layer running on the operating system layer. The hardware layer includes hardware such as a central processing unit (Central Processing Unit, CPU), a memory management unit (Memory Management Unit, MMU), and a memory (also referred to as a main memory). The operating system may be any one or more computer operating systems, for example, a Linux operating system, a Unix operating system, an Android operating system, an iOS operating system, or a Windows operating system, that implement service processing by using a process (Process). The application layer includes applications such as a browser, contacts, word processing software, and instant messaging software. Moreover, in the embodiments of this application, a specific structure of an execution body of a signal transmission method is not particularly limited in this application, provided that a program recording code of the signal transmission method in the embodiments of this application can be run to perform communication based on the wireless communication method in the embodiments of this application. For example, the execution body of the wireless communication method in the embodiments of this application may be the terminal device or the network device, or is a function module that is in the terminal device or the network device and that can invoke a program and execute the program.

In addition, various aspects or features of this application may be implemented as methods, apparatuses, or products using standard programming and/or engineering techniques. The term "product" used in this application encompasses computer programs accessible from any computer readable device, carrier, or medium. For example, a computer readable medium may include but is not limited to: a magnetic storage device (for example, a hard disk, a floppy disk or a magnetic tape), an optical disc (for example, a compact disc (Compact Disc, CD), or a Digital Versatile Disc (Digital Versatile Disc, DVD)), a smart card, and a flash memory device (for example, an erasable programmable read-only memory (Erasable Programmable Read-Only Memory, EPROM), a card, a stick or a key drive). In addition, the various storage media described herein may represent one or more devices and/or other machine readable media configured to store information. The term "machine readable medium" may include but is not limited to, a radio channel and various other media that can store, include, and/or carry instructions and/or data.

A method for sending DCI is described below in detail.

When sending DCI, the network device may select a time-frequency resource block and send the DCI on the selected time-frequency resource block. The terminal device may perform blind detection by using various time-frequency resource blocks, to obtain the DCI.

Figure 3:
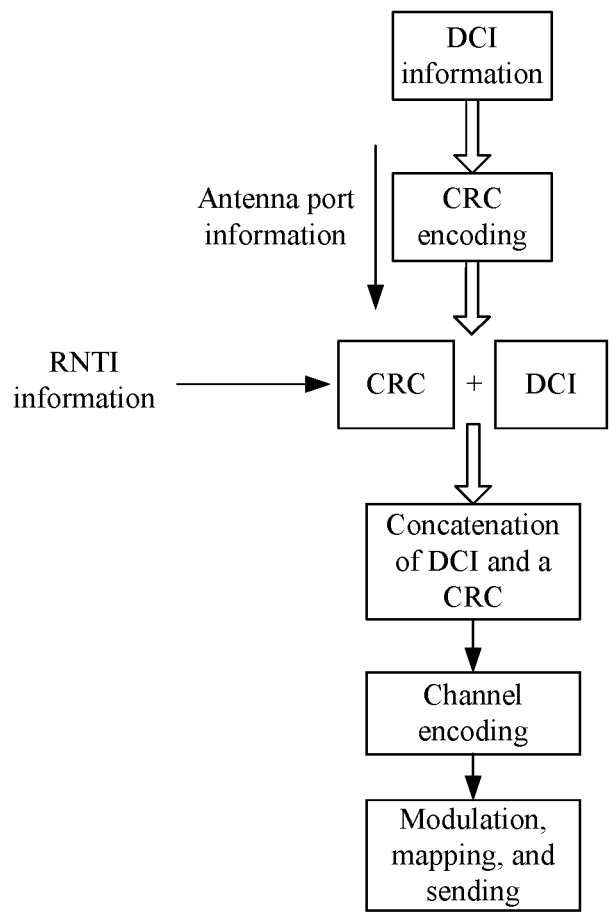
FIG. 3 is a schematic flowchart of processing a PDCCH by a network device.

Optionally, DCI may be carried by using a physical downlink control channel (Physical Downlink Control Channel, PDCCH). As shown in FIG. 3, the network device first performs CRC encoding on the to-be-sent DCI to obtain a CRC, then scrambles the CRC with a radio network temporary identifier (Radio Network Temporary Identifier, RNTI) and antenna port information to obtain a scrambled sequence, concatenates the scrambled sequence with the DCI, and performs procedures of channel encoding, modulation, mapping, and sending.

Figure 4:
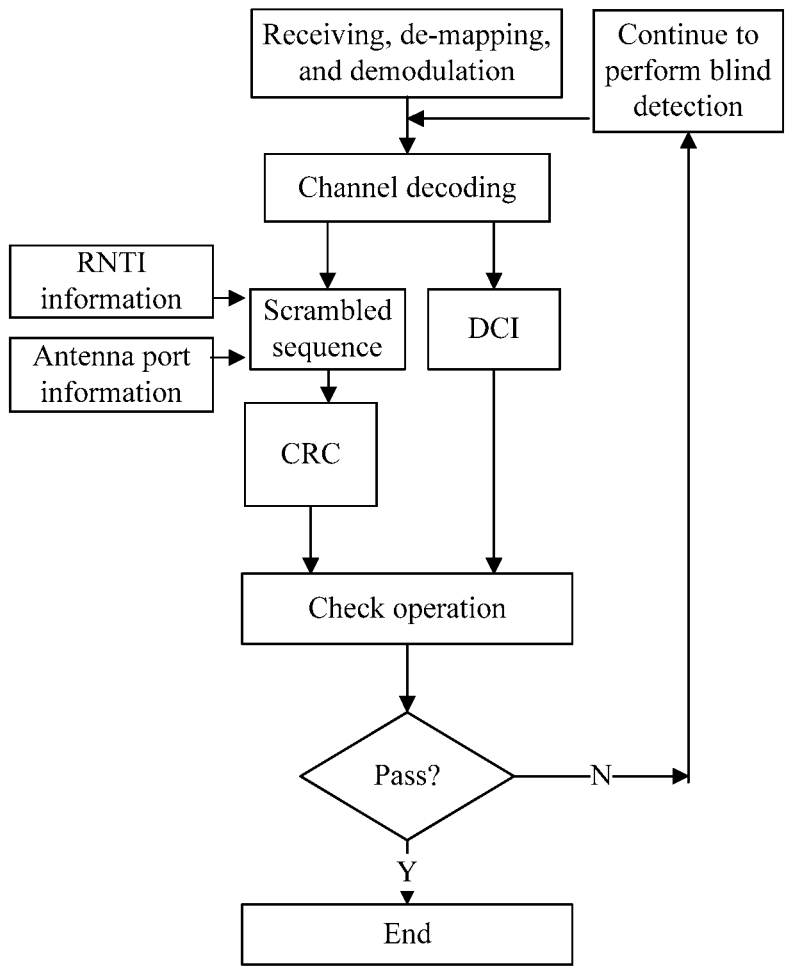
FIG. 4 is a schematic flowchart of processing a PDCCH by a network device.

The terminal device may use a processing manner shown in FIG. 4. Specifically, the terminal device obtains a received signal, and performs de-mapping, demodulation, and channel decoding on the received signal to obtain the scrambled sequence and the DCI. The terminal device may perform a descrambling operation on the scrambled sequence by using a possible value of the RNTI and a possible value of the antenna port information to obtain a CRC, perform a check operation by using the DCI and the CRC, and continue to perform blind detection if the check fails.

The channel encoding in the procedure shown in FIG. 3 can improve reliability of data transmission to ensure communication quality. A polar code proposed by the Turkish professor, Arikan, is the first code that can be theoretically proved to achieve a Shannon's capacity and that has low encoding and decoding complexity. The polar code is a linear block code. An encoding matrix of the polar code is $G_N$, and an encoding process of the polar code is $x_1^N = u_1^N G_N$, where $u_1^N = (u_1, u_2, \ldots, u_N)$ is a binary row vector with a length of N (that is, a code length), $G_N$ is an N×N matrix, and $G_N = F_2^{\otimes(log_2(N))}$. $F_2^{\otimes(log_2(N))}$ is defined as a Kronecker (Kronecker) product of $log_2 N$ matrices $F_2$ and the matrix $$F_2 = \begin{bmatrix} 1 & 0 \\ 1 & 1 \end{bmatrix}.$$

In the encoding process of the polar code, some bits in $u_1^N$ are used to carry information and are referred to as a set of information bits, and an index set of these bits is denoted as $\mathcal{A}$; and the other bits are set to fixed values that are pre-agreed on by a receive end and a transmit end, and are referred to as a set of fixed bits or a set of frozen bits (frozen bits), and an index set of these bits is represented by a complementary set $\mathcal{A}^c$ of $\mathcal{A}$. The encoding process of the polar code is equivalent to: $x_1^N = u_\mathcal{A} G_N(\mathcal{A}) \oplus u_{\mathcal{A}^c} G_N(\mathcal{A}^c)$. Herein, $G_N(\mathcal{A})$ is a submatrix formed by rows in $G_N$ that correspond to indexes in the set $\mathcal{A}$, and $G_N(\mathcal{A}^c)$ is a submatrix formed by rows in $G_N$ that correspond to indexes in the set $\mathcal{A}^c$. $u_\mathcal{A}$ is a set of information bits in $u_1^N$, and there are K information bits. $u_{\mathcal{A}^c}$ is a set of fixed bits in $u_1^N$, there are (N-K) fixed bits, and the fixed bits are known bits. The fixed bits are usually set to 0. However, the fixed bits may be randomly set, provided that the fixed bits are pre-agreed on by the receive end and the transmit end. Therefore, an encoding output of the polar code may be simplified as $x_1^N = u\mathcal{A} \, G_N(\mathcal{A})$. Herein, $u\mathcal{A}$ is a set of information bits in $u_1^N$, and $u\mathcal{A}$ is a row vector with a length of K, that is, $|\mathcal{A}|=K$, $|\cdot|$ represents a quantity of elements in a set, K is a size of an information block, $G_N(\mathcal{A})$ is a submatrix formed by rows in the matrix $G_N$ that correspond to the indexes in the set $\mathcal{A}$, and $G_N(\mathcal{A})$ is a K×N matrix.

A construction process of the polar code is a process of selecting the set A, and the set A decides performance of the polar code. The construction process of the polar code is usually: determining, based on a code length N of a mother code, that N polarized channels in total exist, and correspond to N rows of an encoding matrix, respectively; calculating reliability of the polarized channels; and using indexes of the first K polarized channels with highest reliability as elements of the set $\mathcal{A}$, and using indexes corresponding to remaining (N-K) polarized channels as elements of the index set $\mathcal{A}^c$ of fixed bits. The set $\mathcal{A}$ is used to determine a location of an information bit, and the set $\mathcal{A}^c$ is used to determine a location of a fixed bit.

It can be learned from the encoding matrix that a code length of an original polar code (mother code) is 2 raised to the integer power. During actual application, rate matching needs to be performed to obtain a polar code with any code length.

Currently, polar coding includes: CA polar coding, PC polar coding, and PC-CA-polar coding.

For CA-polar, PC-polar, and PC-CA-polar, error detection or error correction can be performed by using a CRC. For a decoding algorithm used at a polar decoding end, a successive cancellation list (Successive Cancellation List, SCL) decoding algorithm can be used. When the SCL decoding algorithm is used, a decoding output can be obtained only after a plurality of checks using a CRC are performed. However, the plurality of checks using a CRC cause a loss in a FAR. For example, for a CRC of x bits and a list of a polar decoder=L, $FAR^-=L*2-x$ is equivalent that log 2(L) bits are lost in the CRC. To meet a requirement FAR=2-16 of a control channel, a quantity of bits of a CRC may be greater than 16, and is, for example, 18, 19, or 20.

In a current scrambling scheme, it is assumed that a length of a CRC is 16 bits. When an antenna port selection function in a closed loop of the terminal device is unavailable, the network device scrambles the 16-bit CRC with a 16-bit RNTI, to obtain a scrambled sequence.

When the antenna port selection function in the closed loop of the terminal device is available, in addition to the 16-bit RNTI with which the 16-bit CRC is scrambled, a DCI format 0 further carries antenna port information of the terminal device through one more time of scrambling.

Figure 5:
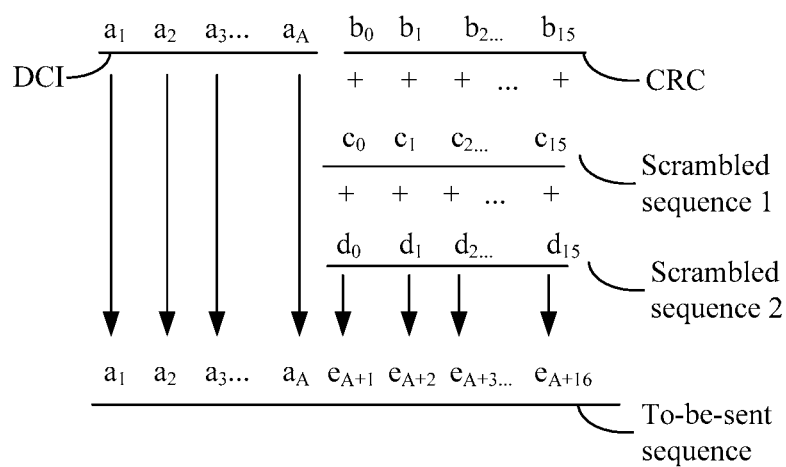
FIG. 5 is a schematic diagram of a conventional scrambling operation.

For example, as shown in FIG. 5, a length of a CRC is 16 bits. That is, the CRC includes bits $b_0, b_1, b_2, \ldots, b_{15}$. The network device may generate a scrambled sequence, that is, a sequence $c_0, c_1, c_2, \ldots, c_{15}$ based on an RNTI, and generate a scrambled sequence 3, that is, a sequence $d_0, d_1, d_2, \ldots, d_{15}$ based on an antenna port. The network device may scramble the CRC with the scrambled sequence 1 to obtain a once-scrambled sequence, and then scramble the once-scrambled sequence with the scrambled sequence 2, to obtain a to-be-sent scrambled sequence $e_{A+1}, e_{A+2}, e_{A+3}, \ldots, e_{A+16}$. A to-be-sent sequence may be obtained by concatenating the scrambled sequence with the DCI.

However, in the scheme shown in FIG. 5, a sequence obtained by scrambling a CRC with one RNTI and one antenna port may be the same as a sequence obtained by scrambling a CRC with another RNTI, or may be the same as a sequence obtained by scrambling a CRC with another RNTI and another antenna port. As a result, the terminal device may obtain an incorrect RNTI and an incorrect antenna port through descrambling.

Therefore, the embodiments of this application provide a wireless communication method, so as to reduce a probability that a terminal device obtains incorrect configuration information.

Figure 6:
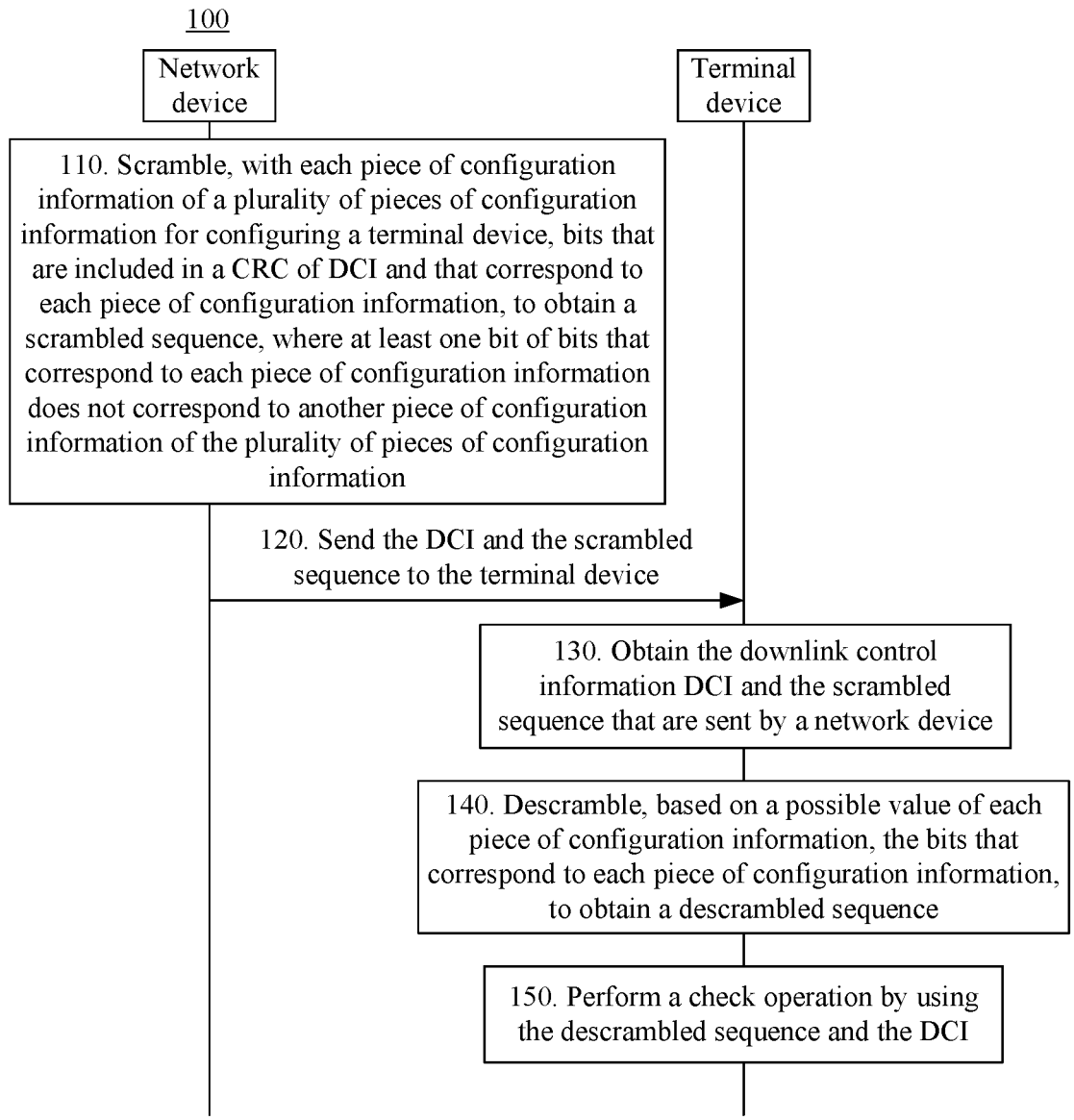
FIG. 6 is a schematic flowchart of a wireless communication method according to an embodiment of this application.

FIG. 6 is a schematic flowchart of a wireless communication method 100 according to an embodiment of this application. As shown in FIG. 1, the method 100 includes the following content.

In step 110, a network device scrambles, with each piece of configuration information of a plurality of pieces of configuration information used for configuring a terminal device, bits that are included in a CRC of DCI and that correspond to each piece of configuration information, to obtain a scrambled sequence, where at least one bit of bits that correspond to each piece of configuration information does not correspond to another piece of configuration information of the plurality of pieces of configuration information.

Optionally, the configuration information in this embodiment of this application includes an RNTI of the terminal device and antenna port information of the terminal device.

The RNTI of the terminal device is information for identifying the terminal device during communication between the terminal device and the network device.

Optionally, the RNTI may include a serving radio network controller (Radio Network Controller, RNC) RNTI (Serving RNC RNTI, S-RNTI), a drift RNC RNTI (drift RNC RNTI, d-RNTI), a cell RNTI (Cell RNTI, C-RNTI), a UMTS Terrestrial Radio Access Network (Terrestrial Radio Access Network-UMTS, UTRAN RNTI) (u-RNTI), a downlink shared channel (Downlink Shared Channel, DSCH) RNTI (DSCH-RNTI), or the like.

It should be understood that with development of wireless communications, a term indicating "information for identifying the terminal device during communication between the terminal device and the network device" may change. That is, the information may be no longer referred to as an RNTI. However, any term that identifies the terminal device during communication between the terminal device and the network device falls within the protection scope of this embodiment of this application.

Optionally, an antenna port of the terminal device in this embodiment of this application may be used for communication of the terminal device. The antenna port may be a logic port or a physical port with an antenna property.

Similar to an RNTI, any port with an antenna property falls within the protection scope of this embodiment of this application.

It should be understood that although in this embodiment of this application, an RNTI and an antenna port are used as examples to describe this embodiment of this application, the configuration information, mentioned in this embodiment of this application, for configuring the terminal device may include any information that is configured by the network device and that is used to implement communication between the terminal device and the network device.

Optionally, a quantity of bits in the CRC in this embodiment of this application may be 16, or may be 18, 19, 20, or the like. Specifically, the quantity of bits included in the CRC may be determined based on an actual case, for example, determined based on a channel encoding scheme.

This is not specifically limited in this embodiment of this application.

Optionally, the bits corresponding to each piece of configuration information in this embodiment of this application may be consecutive bits.

Optionally, if bits corresponding to various configuration information are consecutive bits, there may be a separating dummy bit (that is, a bit that does not need to be scrambled with configuration information) or there may be no separating bit between bits corresponding to two adjacent pieces of configuration information.

Optionally, bits corresponding to the plurality of pieces of configuration information may be interleaved. When the bits are interleaved, there may be a separating dummy bit or there may be no separating dummy bit between the bits.

Optionally, in this embodiment of this application, a sum of quantities of bits corresponding to the plurality of pieces of configuration information is greater than or equal to a total quantity of bits included in the CRC.

Optionally, when a sum of quantities of bits corresponding to the plurality of pieces of configuration information is greater than or equal to a total quantity of bits included in the CRC, each bit in the CRC corresponds to at least one piece of configuration information.

In other words, when a sum of quantities of bits that need to be scrambled with the plurality of pieces of configuration information is greater than or equal to a total length of the CRC, each bit in the CRC may be scrambled with configuration information. In this way, if the CRC has a limited length, a proportion of overlapping scrambling performed by using configuration information can be minimized, so that a probability that the terminal device incorrectly descrambles configuration information can be reduced.

Optionally, a sum of quantities of bits corresponding to the plurality of pieces of configuration information is less than a total quantity of bits included in the CRC.

Optionally, when a sum of quantities of bits corresponding to the plurality of pieces of configuration information is less than a total quantity of bits included in the CRC, each bit in the CRC corresponds to at most one piece of configuration information.

In other words, when a sum of quantities of bits that need to be scrambled with the plurality of pieces of configuration information is less than a total length of the CRC, the CRC may be scrambled with the plurality of pieces of configuration information in a non-overlapping manner, so that a probability of incorrect descrambling can further be reduced.

Optionally, a scrambled sequence may be generated based on a plurality of pieces of configuration information, and the CRC is scrambled with the scrambled sequence, to obtain a scrambled sequence.

In an implementation, a scrambled sequence corresponding to each piece of configuration information may be generated based on the configuration information, and the CRC is scrambled with the scrambled sequence corresponding to the configuration information. An exclusive OR operation may be used as a scrambling operation of each scrambled sequence.

Optionally, a length of the scrambled sequence corresponding to each piece of configuration information may be equal to the length of the CRC.

Optionally, in the scrambled sequence corresponding to each piece of configuration information, a value of a bit other than bits carrying configuration information is 0.

In another implementation, a scrambled sequence may be generated based on each piece of configuration information. A scrambling operation is performed on a plurality of scrambled sequences to obtain sequences used to scramble the CRC. The CRC is scrambled with the sequence used to scramble the CRC.

Optionally, in this embodiment of this application, a quantity of pieces of configuration information with which the CRC is scrambled is not limited in this embodiment of this application. However, for a clearer understanding of this application, that the plurality of pieces of configuration information include first configuration information and second configuration information is used as an example below for detailed description.

Specifically, the first configuration information corresponds to M first bits of a CRC, and the second configuration information corresponds to N second bits of the CRC. The M first bits are scrambled with the first configuration information, and the N second bits are scrambled with the second configuration information.

Optionally, the first configuration information is used to indicate an RNTI configured for the terminal device.

Optionally, the second configuration information is used to indicate an antenna port configured for the terminal device for communication.

The M first bits may be consecutive bits, and the N second bits may be consecutive bits.

Figure 7:
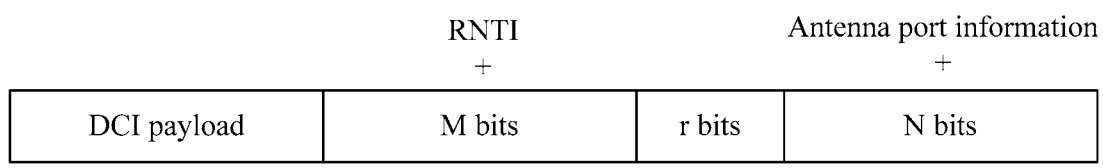
FIG. 7 is a schematic diagram of locations, in a CRC, of bits corresponding to configuration information according to an embodiment of this application.

There may be a separating dummy bit between consecutive M first bits and the consecutive N second bits. For example, as shown in FIG. 7, the M first bits and the N second bits are separated by r dummy bits.

Figure 8:
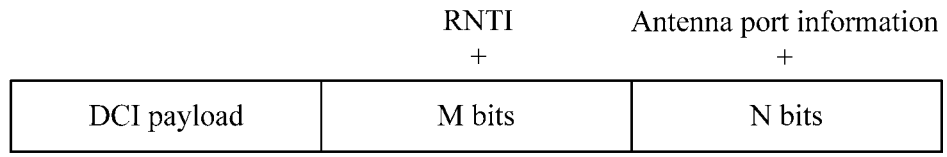
FIG. 8 is a schematic diagram of locations, in a CRC, of bits corresponding to configuration information according to an embodiment of this application.

There may be no separating dummy bit between the consecutive M first bits and the consecutive N second bits, for example, a case shown in FIG. 8.

Figure 9:
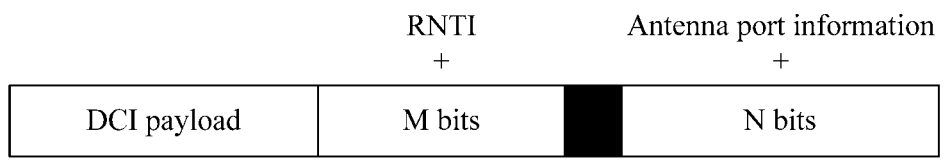
FIG. 9 is a schematic diagram of locations, in a CRC, of bits corresponding to configuration information according to an embodiment of this application.

Optionally, a quantity sum of M and N may be less than the total quantity of bits included in the CRC, for example, a case shown in FIG. 9. A grey-filled part is an overlapping part of the first bits and the second bits.

Optionally, a quantity sum of M and N may be equal to the total quantity of bits included in the CRC, for example, the case shown in FIG. 8.

Figure 10:
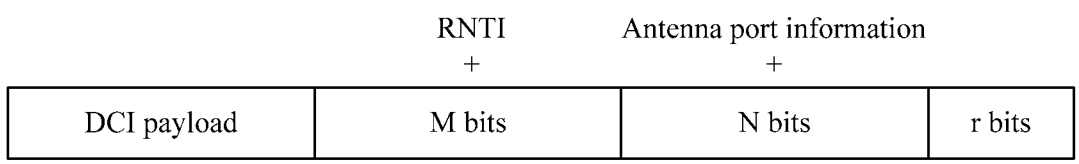
FIG. 10 is a schematic diagram of locations, in a CRC, of bits corresponding to configuration information according to an embodiment of this application.

Optionally, a quantity of M and N may be greater than or equal to the total quantity of bits included in the CRC, for example, a case shown in FIG. 10.

It should be understood that although the M first bits are located before the N second bits in FIG. 7 to FIG. 10, this embodiment of this application is not limited thereto. The N second bits may be located before the M first bits in this embodiment of this application.

Optionally, a scrambled sequence may be generated based on first configuration information and second configuration information, and the CRC is scrambled with the scrambled sequence to obtain a scrambled sequence.

In an implementation, a second scrambled sequence is determined based on the first configuration information and the second configuration information, where a length of the second scrambled sequence is equal to a length occupied by the M first bits and the N second bits in the CRC, the second scrambled sequence includes M third bits and N fourth bits, the M third bits carry the first configuration information, and the N fourth bits carry the second configuration information; and the CRC is scrambled with the second scrambled sequence.

Figure 11:
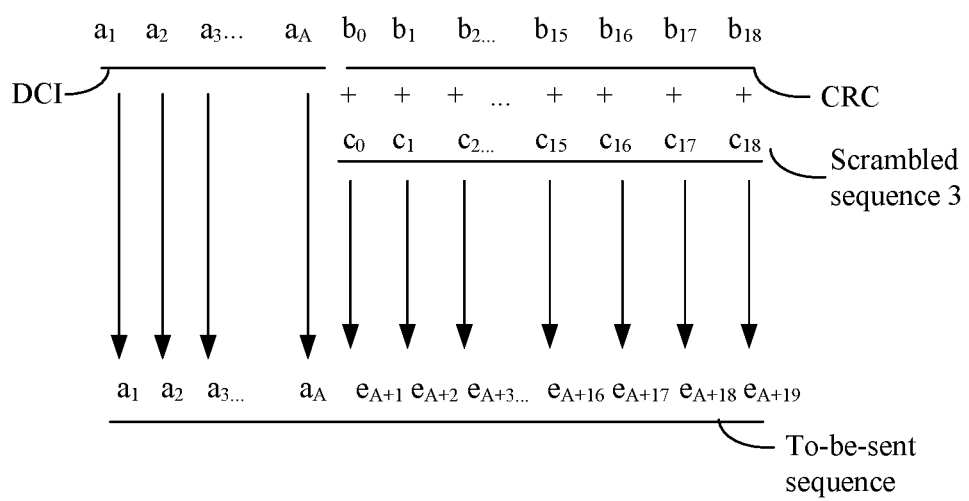
FIG. 11 is a schematic diagram of a scrambling operation according to an embodiment of this application.

For example, as shown in FIG. 11, the length of the CRC is 19 bits. That is, the CRC includes bits $b_0, b_1, b_2, \ldots,$ bis. The bits $b_0, b_1, b_2, \ldots, b_{15}$ may be used to scramble the RNTI. The bits $b_{16}, b_{17},$ bis may be used to scramble the antenna port. A 19-bit scrambled sequence 3, that is, $c_0, c_1, c_2, \ldots, c_{18}$, may be generated based on the RNTI and the antenna port. The bits $c_0, c_1, c_2, \ldots, c$ is in the scrambled sequence carry the RNTI, and the bits $c_{16}, c_{17}, c$ is in the scrambled sequence 3 carry antenna port information. The network device may scramble the bits $b_0, b_1, b_2, \ldots, b$ is included in the CRC with a scrambled sequence 1, to obtain a scrambled sequence $e_{A+1}, e_{A+2}, e_{A+3}, \ldots, e_{A+19}$. A to-be-sent sequence may be obtained by concatenating the scrambled sequence with the DCI.

In another implementation, a third scrambled sequence is determined based on the first configuration information, where the third scrambled sequence includes M fifth bits; the M first bits are scrambled with the third scrambled sequence; a fourth scrambled sequence is determined based on the second configuration information, where the fourth scrambled sequence includes N sixth bits; and the N second bits are scrambled with the fourth scrambled sequence.

Figure 12:
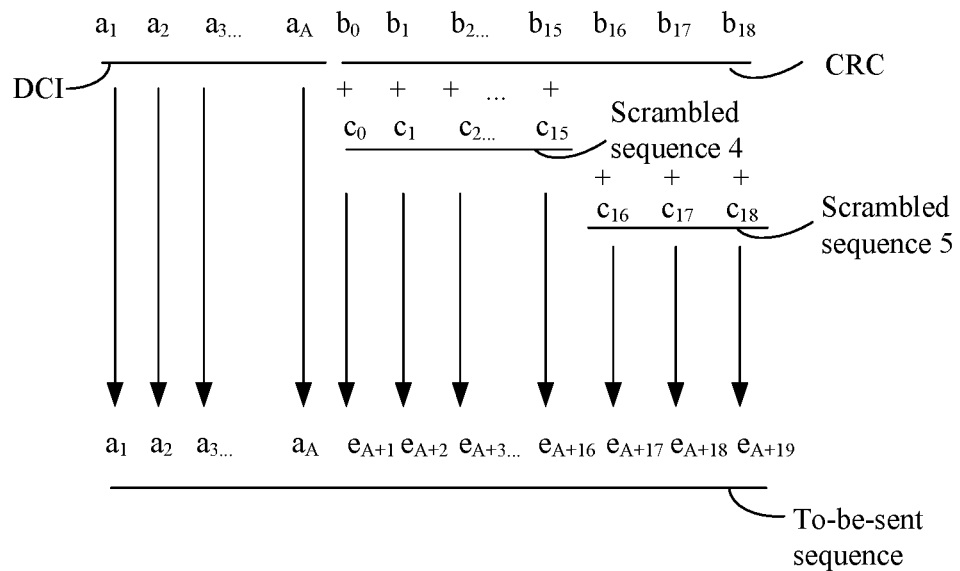
FIG. 12 is a schematic diagram of a scrambling operation according to an embodiment of this application.

For example, as shown in FIG. 12, the length of the CRC is 19 bits. That is, the CRC includes bits $b_0, b_1, b_2, \ldots, b$ is. The bits $b_0, b_1, b_2, \ldots, b_{15}$ may be used to scramble the RNTI, and the bits $b_{16}, b_{17}, b$ is may be used to scramble the antenna port. A scrambled sequence 4, that is, the sequence $c_0, c_1, c_2, \ldots, c_{15}$, may be generated based on the RNTI. A scrambled sequence 5, that is, the sequence $c_{16}, c_{17}, c$ is, may be generated based on the antenna port. The network device may scramble the bits $b_0, b_1, b_2, \ldots, b_{15}$ included in the CRC with the scrambled sequence 4, and scramble the bits $b_{16}, b_{17}, b$ is included in the CRC with the scrambled sequence 5. Therefore, a scrambled sequence $e_{A+1}, e_{A+2}, e_{A+3}, \ldots, e_{A+19}$ may be obtained. A to-be-sent sequence may be obtained by concatenating the scrambled sequence with the DCI.

Optionally, a quantity of bits included in the third scrambled sequence is greater than M, and a length of the third scrambled sequence is equal to a length of the CRC. Optionally, a value of a bit other than the M first bits in the third scrambled sequence is 0.

Optionally, a quantity of bits included in the fourth scrambled sequence is greater than N, and a length of the fourth scrambled sequence is equal to a length of the CRC. Optionally, a value of a bit other than the N second bits in the fourth scrambled sequence is 0.

Figure 13:
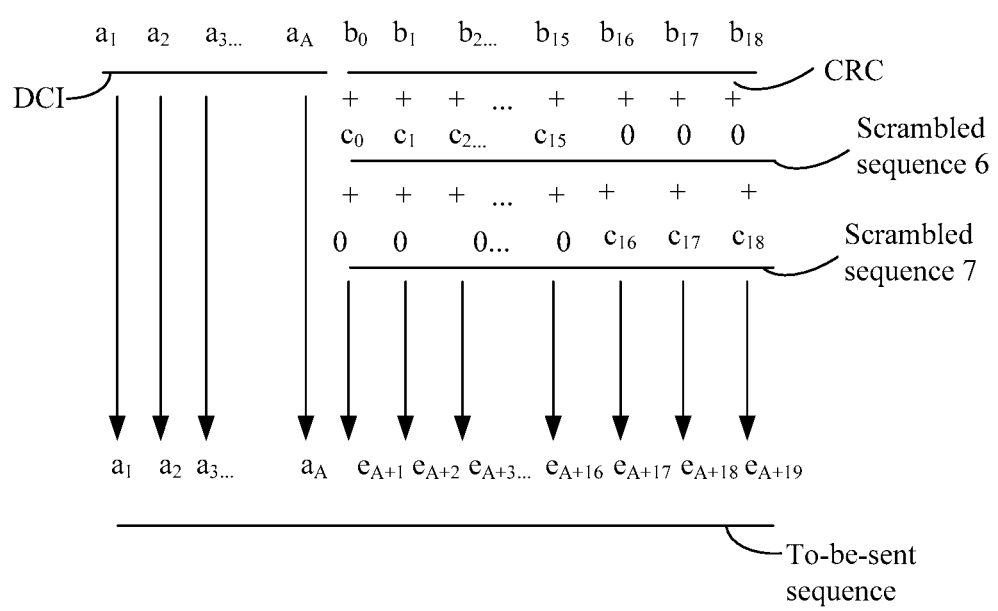
FIG. 13 is a schematic diagram of a scrambling operation according to an embodiment of this application.

For example, as shown in FIG. 13, the length of the CRC is 19 bits. That is, the CRC includes bits $b_0, b_1, b_2, \ldots, b$ is. The bits $b_0, b_1, b_2, \ldots, b_{15}$ may be used to scramble the RNTI. The bits $b_{16}, b_{17}, b$ is may be used to scramble the antenna port. A scrambled sequence 6, that is, a sequence having a total of 19 bits $c_0, c_1, c_2, \ldots, c_{15}, 0, 0, 0$, may be generated based on the RNTI, and a scrambled sequence 7, that is, a sequence having a total of 19 bits $0, 0, \ldots, 0, c_{16}, c_{17}, c_{18}$, may be generated based on the antenna port. The network device may scramble the CRC with the scrambled sequence 6, and scramble the CRC with the scrambled sequence 7. In this way, a scrambled sequence $e_{A+1}, e_{A+2}, e_{A+3}, \ldots, e_{A+19}$ can be obtained. A to-be-sent sequence may be obtained by concatenating the scrambled sequence with the DCI. The method for generating a scrambled sequence and the scrambling method according to this embodiment of this application have been described below with reference to FIG. 11 to FIG. 13. However, this application may further have other implementations.

For example, a scrambled sequence A may be generated based on all the first configuration information and a part of the second configuration information. A scrambled sequence B is generated based on a remaining part of the second configuration information. The CRC is scrambled with the scrambled sequence A, and the sequence that has been scrambled with the scrambled sequence A is further scrambled with the scrambled sequence B. A length of the scrambled sequence A and a length of the scrambled sequence B are both equal to the length of the CRC. The scrambled sequence A includes P bits carrying all the first configuration information and Q bits carrying the part of the second configuration information. The P bits and the Q bits do not overlap. H bits in the scrambled sequence B carry the remaining part of the second configuration information. The H bits are used to be scrambled at least some bits in the once-scrambled sequence that are scrambled with the first configuration information.

Optionally, the network device may determine a first scrambled sequence based on the antenna port configured for the terminal device for communication and a mapping relationship between a plurality of antenna ports and a plurality of scrambled sequences (for example, as shown in the following Table 1 to Table 3); and scramble the N second bits with the first scrambled sequence.

TABLE 1

| Antenna port | Scrambled sequence |
| --- | --- |
| Port 0 | <0, 0, 0> |
| Port 1 | <1, 1, 1> or <0, 0, 1> or <1, 0, 0> |

TABLE 2

| Antenna port | Scrambled sequence |
| --- | --- |
| Port 0 | <0, 0> |
| Port 1 | <1, 1> or <0, 1> or <1, 0> |

TABLE 3

| Antenna port | Scrambled sequence |
| --- | --- |
| Port 0 | <0> |
| Port 1 | <1> |

Optionally, a quantity of bits included in the first scrambled sequence may be equal to a quantity of bits corresponding to the antenna port in the CRC.

Optionally, corresponding bits in the CRC may be directly scrambled with the antenna port, or a scrambling operation may be performed on a scrambled sequence corresponding to the CRC, to obtain a sequence used to scramble the CRC, and the CRC is scrambled with the sequence used to scramble the CRC.

Optionally, the scrambled sequence mentioned in this embodiment of this application may also be referred to as a scrambled mask or a mask sequence.

Optionally, the scrambling operation in this embodiment of this application may be an exclusive OR operation or another operation.

In step 120, the network device sends the DCI and the scrambled sequence to the terminal device.

Optionally, polar coding is performed on the DCI and the scrambled sequence, to obtain coded bits; and the coded bits are sent to the terminal device.

In step 130, the downlink control information DCI and the scrambled sequence that are sent by the network device are obtained, where bits corresponding to the scrambled sequence are scrambled with each piece of configuration information of the plurality of pieces of configuration information used for configuring the terminal device by the network device, each piece of configuration information corresponds to at least one bit in the scrambled sequence, and at least one bit of the bits that correspond to each piece of configuration information does not correspond to another piece of configuration information of the plurality of pieces of configuration information.

Optionally, the terminal device obtains a received signal; and performs SCL decoding on the received signal, to obtain the DCI and the scrambled sequence.

Optionally, the bits that correspond to each piece of configuration information are consecutive bits.

Optionally, the first configuration information is used to indicate a radio network temporary identifier RNTI configured for the terminal device by the network device.

Optionally, the second configuration information is used to indicate an antenna port configured for the terminal device by the network device for communication.

Optionally, when a sum of quantities of bits corresponding to the plurality of pieces of configuration information is greater than or equal to a total quantity of bits included in the scrambled sequence, each bit in the scrambled sequence corresponds to at least one piece of configuration information.

Optionally, when a sum of quantities of bits corresponding to the plurality of pieces of configuration information is less than a total quantity of bits included in the scrambled sequence, each bit in the scrambled sequence corresponds to at most one piece of configuration information.

Optionally, the plurality of pieces of configuration information include first configuration information and second configuration information, where the first configuration information corresponds to M first bits in the scrambled sequence, and the second configuration information corresponds to N second bits in the scrambled sequence. The M first bits are descrambled based on a possible value of the first configuration information, and the N second bits are descrambled based on a possible value of the second configuration information.

In step 140, the bits that correspond to each piece of configuration information are descrambled based on a possible value of each piece of configuration information, to obtain a descrambled sequence.

Optionally, a first descrambled sequence is determined based on an antenna port possibly configured for the terminal device by the network device for communication and a mapping relationship between a plurality of antenna ports and a plurality of scrambled sequences; and the N second bits are descrambled by using the first descrambled sequence.

Optionally, a second descrambled sequence is determined based on a possible value of the first configuration information and a possible value of the second configuration information, where a length of the second descrambled sequence is equal to a length occupied by the M first bits and the N second bits in the scrambled sequence, the second descrambled sequence includes M third bits and N fourth bits, the M third bits carry a possible value of the first configuration information, and the N fourth bits carry a possible value of the second configuration information; and the scrambled sequence is descrambled by using the second descrambled sequence.

Optionally, a third descrambled sequence is determined based on a possible value of the first configuration information, where the third descrambled sequence includes M fifth bits; the M first bits are descrambled by using the third descrambled sequence; a fourth descrambled sequence is determined based on a possible value of the second configuration information, where the fourth descrambled sequence includes N sixth bits; and the N second bits are descrambled by using the fourth descrambled sequence.

In an implementation, a quantity of bits included in the third descrambled sequence is greater than M, and a length of the third descrambled sequence is equal to a length of the CRC. Optionally, a value of a bit other than the M first bits in the third descrambled sequence is 0.

In an implementation, a quantity of bits included in the fourth descrambled sequence is greater than N, and a length of the fourth descrambled sequence is equal to a length of the CRC. Optionally, a value of a bit other than the N second bits in the fourth descrambled sequence is 0.

In step 150, a check operation is performed by using the descrambled sequence and the DCI.

Therefore, in this embodiment of this application, the bits that are included in the cyclic redundancy check CRC of the downlink control information DCI and that correspond to each piece of configuration information are scrambled with each piece of configuration information of the plurality of pieces of configuration information used for configuring a terminal device, to obtain the scrambled sequence, where the at least one bit of the bits that correspond to each piece of configuration information does not correspond to another piece of configuration information of the plurality of pieces of configuration information. Compared with a case in which each bit corresponding to at least one piece of configuration information corresponds to another piece of configuration information, a probability of obtaining incorrect configuration information through descrambling can be reduced.

Figure 14:
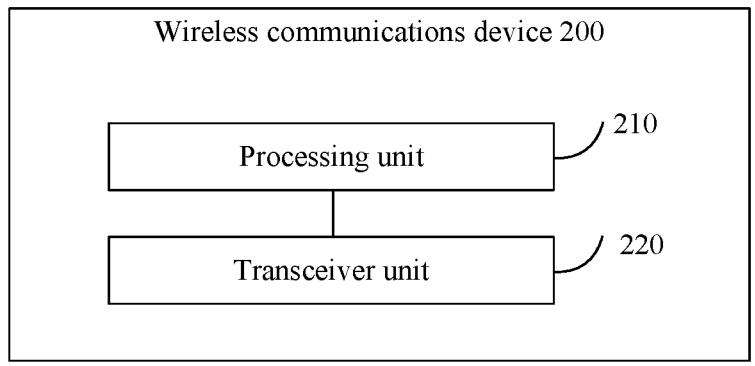
FIG. 14 is a schematic block diagram of a wireless communications device according to an embodiment of this application.

FIG. 14 is a schematic block diagram of a wireless communications device 200 according to an embodiment of this application. As shown in FIG. 14, the wireless communications device 200 includes a processing unit 210 and a transceiver unit 220. The wireless communications device 200 may correspond to (for example, may be configured in or may be) the network device described in the method 100. Moreover, the units in the wireless communications device 200 are configured to perform the operations or processing processes performed by the network device in the method 100. Herein, to avoid repetition, details are omitted.

Figure 15:
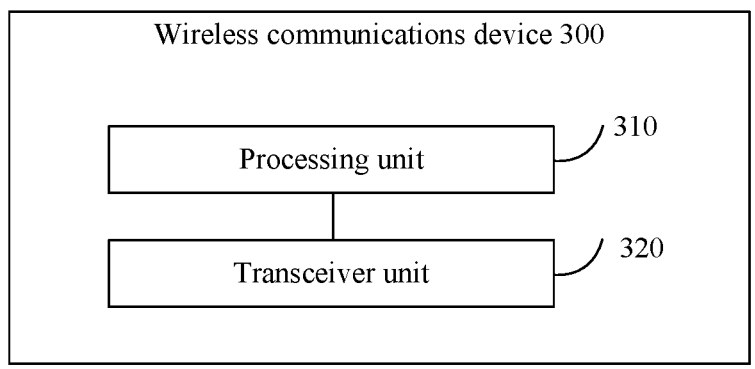
FIG. 15 is a schematic block diagram of a wireless communications device according to an embodiment of this application.

FIG. 15 is a schematic block diagram of a wireless communications device 300 according to an embodiment of this application. As shown in FIG. 15, the wireless communications device 300 includes a processing unit 310 and a transceiver unit 320. The wireless communications device 300 may correspond to (for example, may be configured in or may be) the terminal device described in the method 100. Moreover, the units in the wireless communications device 300 are configured to perform the operations or processing processes performed by the terminal device in the method 100. Herein, to avoid repetition, details are omitted.

Figure 16:
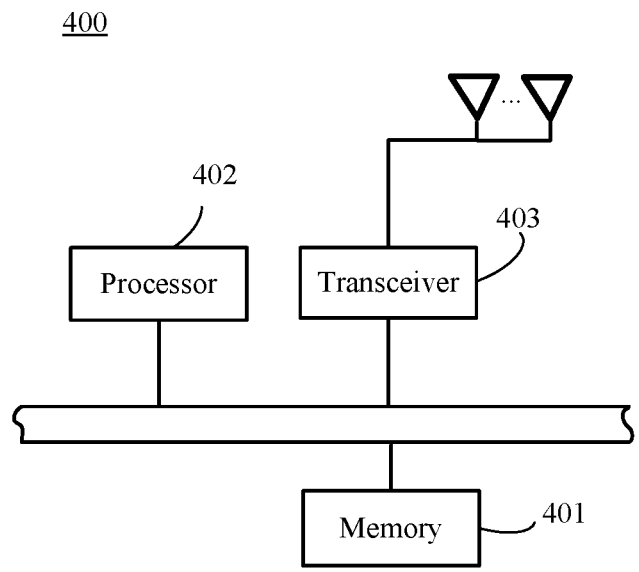
FIG. 16 is a schematic block diagram of a wireless communications device according to an embodiment of this application.

FIG. 16 is a schematic block diagram of a communications device 400 according to an embodiment of this application. As shown in FIG. 16, the device 400 includes: a transceiver 403, a memory 401, and a processor 402 among which communication and connection are implemented by using, for example, a bus.

It should be noted that content of a method performed by the processor 402 is the same as the content of the method performed by the network device, and details are no longer described.

The memory 401 is configured to store a program. The memory may be a RAM (Random Access Memory) or a ROM (Read Only Memory) or a flash memory. The memory may be separately located in the communications device, or may be located in the processor 402.

The processor 402 may invoke the program stored in the memory to perform the operations performed by the network device in the method 100.

Figure 17:
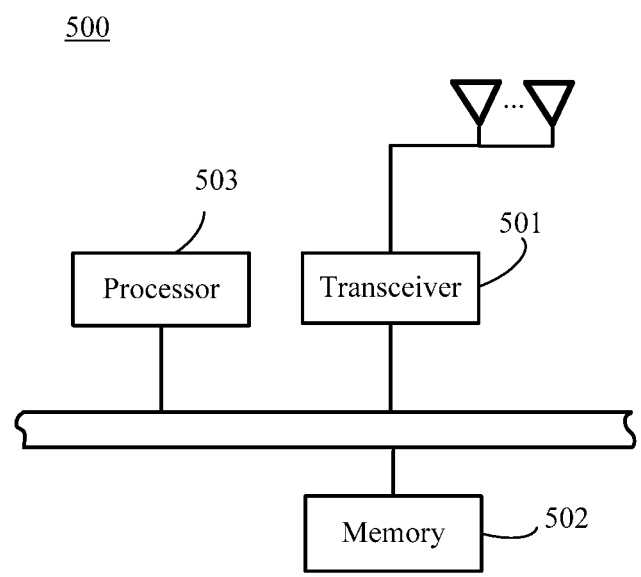
FIG. 17 is a schematic block diagram of a wireless communications device according to an embodiment of this application.

FIG. 17 is a schematic block diagram of a wireless communications device 500 according to an embodiment of this application. As shown in FIG. 17, the device 500 includes: a transceiver 503, a memory 501, and a processor 502 among which communication and connection are implemented by using, for example, a bus.

It should be noted that content of a method performed by the processor 502 is the same as the content of the method performed by the network device, and details are no longer described.

The memory 501 is configured to store a program. The memory may be a RAM (Random Access Memory, random access memory) or a ROM (Read Only Memory, read-only memory) or a flash memory. The memory may be separately located in the communications device, or may be located in the processor 502.

The processor 502 may invoke the program stored in the memory to perform the operations performed by the terminal device in the method 100.

It should be noted that the method embodiments may be applied to a processor or implemented by using a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general processor, a digital signal processor (Digital Signal Processor, DSP), an application-specific integrated circuit (Application Specific Integrated Circuit, ASIC), a field programmable gate array (Field Programmable Gate Array, FPGA), another programmable logic device, a discrete gate, a transistor logic device, or a discrete hardware component. All methods, steps, and logical block diagrams disclosed in this embodiment of this application may be implemented or performed. The general purpose processor may be a microprocessor or the processor may be any normal processor, or the like. Steps of the methods disclosed in the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification is intended to include but not limited to these memories and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the embodiments of this application. The execution sequences of the processes should be determined based on functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in various embodiments of the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the embodiments of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in various embodiments of the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application.

What is claimed is:

1. A method for processing a bit sequence, performed by a device in a wireless communication network, comprising:
   obtaining downlink control information (DCI);
   performing cyclic redundancy check (CRC) on the DCI, to obtain bit sequence, wherein the bit sequence comprises: M first bits and N second bits, wherein the M first bits and the N second bits are CRC bits, wherein M and N are positive integers;
   scrambling the M first bits with a first configuration information, to obtain a scrambled sequence, wherein the first configuration information indicates a radio network temporary identifier (RNTI) configured for a user terminal;
   generating a to-be-encoded sequence whose length is B according to the scrambled sequence, wherein the to-be encoded sequence comprises: the DCI, the scrambled sequence and the N second bits, and wherein the scrambled sequence is located after the N second bits, the DCI is located before the N second bits, and B is a positive integer;
   performing polar encoding on the to-be-encoded sequence to obtain an encoded sequence, wherein performing polar encoding on the to-be-encoded sequence to obtain the encoded sequence comprises:
      generating u, a binary row vector, according to the to-be-encoded sequence, wherein u=(u1, u2, . . . , uN), N is a positive integer greater than B, and the to-be-encoded sequence, based on u's channel reliability, is mapped into first B locations with high reliability in the u; and
      encoding the u by an encoding formula to obtain the encoded sequence, and wherein the encoding formula is:

$$d = u \cdot G_N$$

d is the encoded sequence, and $G_N$ is a matrix with N rows and N columns; and
outputting the encoded sequence.

2. The method according to claim 1, further comprising: performing rate matching on the encoded sequence to obtain a rate matched sequence.

3. The method according to claim 2, further comprising: modulating the rate matched sequence to obtain a modulated sequence.

4. The method according to claim 1, wherein the method further comprises:
   scrambling the N second bits with a second configuration information, to obtain a second scrambled sequence, wherein the second configuration information indicates an antenna port configured for the device for communication.

5. The method according to claim 4, wherein the second scrambled sequence comprises: the DCI, the M first bits of the scrambled sequence and the N second bits of the second scrambled sequence.

6. A device in a wireless communication network, comprising a processor and a memory storing program instructions for execution by the processor; wherein when executed by the processor, the program instructions cause the device to:
   obtain downlink control information (DCI);
   perform cyclic redundancy check (CRC) on the DCI, to obtain bit sequence, wherein the bit sequence comprises: M first bits and N second bits, wherein the M first bits and the N second bits are CRC bits, wherein M and N are positive integers;
   scramble the M first bits with a first configuration information, to obtain a scrambled sequence, wherein the first configuration information indicates a radio network temporary identifier (RNTI) configured for a user terminal;
   generate a to-be-encoded sequence whose length is B according to the scrambled sequence, wherein the to-be-encoded sequence comprises: the DCI, the scrambled sequence and the N second bits, and wherein the scrambled sequence is located after the N second bits, the DCI is located before the N second bits, and B is a positive integer;
   performing polar encoding on the to-be-encoded sequence to obtain an encoded sequence, wherein performing polar encoding on the to-be-encoded sequence to obtain the encoded sequence comprises:
      generating u, a binary row vector, according to the to-be-encoded sequence, wherein u=(u1, u2, . . . , uN), N is a positive integer greater than B, and the to-be-encoded sequence, based on u's channel reliability, is mapped into first B locations with high reliability in the u; and
      encoding the u by an encoding formula to obtain the encoded sequence, and wherein the encoding formula is:

$$d = u \cdot G_N$$

d is the encoded sequence, and $G_N$ is a matrix with N rows and N columns; and
output the encoded sequence.

7. The device according to claim 6, wherein the program instructions further cause the device to:
   perform rate matching on the encoded sequence to obtain a rate matched sequence.

8. The device according to claim 7, wherein the program instructions further cause the device to:
modulate the rate matched sequence to obtain a modulated sequence.

9. The device according to claim 6, wherein the processor is further configured to:
scramble the N second bits with a second configuration information, to obtain a second scrambled sequence, wherein the second configuration information indicates an antenna port configured for the device for communication.

10. The device according to claim 9, wherein the scrambled sequence comprises: the DCI, the M first bits of the scrambled sequence and the N second bits of the second scrambled sequence.

11. A non-transitory computer readable medium storing program codes thereon for execution by a processor in a device, wherein the program codes comprise instructions for:
obtaining downlink control information (DCI);
performing cyclic redundancy check (CRC) on the DCI, to obtain bit sequence, wherein the bit sequence comprises: M first bits and N second bits, wherein the M first bits and the N second bits are CRC bits, wherein M and N are positive integers;
scrambling the M first bits with a first configuration information, to obtain a scrambled sequence, wherein the first configuration information indicates a radio network temporary identifier (RNTI) configured for a user terminal;
generating a to-be-encoded sequence whose length is B according to the scrambled sequence, wherein the to-be-encoded sequence comprises: the DCI, the scrambled sequence and the N second bits, and wherein the scrambled sequence is located after the N second bits, the DCI is located before the N second bits, and B is a positive integer;
performing polar encoding on the to-be-encoded sequence to obtain an encoded sequence, wherein performing polar encoding on the to-be-encoded sequence to obtain the encoded sequence comprises:
generating u, a binary row vector, according to the to-be-encoded sequence, wherein u=(u1, u2, . . . , uN), N is a positive integer greater than B, and the to-be-encoded sequence, based on u's channel reliability, is mapped into first B locations with high reliability in the u; and
encoding the u by an encoding formula to obtain the encoded sequence, and wherein the encoding formula is:

$d = u \cdot G_N$ d is the encoded sequence, and $G_N$ is a matrix with N rows and N columns; and
outputting the encoded sequence.

12. The non-transitory computer readable medium according to claim 11, wherein the program codes further comprise instructions for:
performing rate matching on the encoded sequence to obtain a rate matched sequence.

13. The non-transitory computer readable medium according to claim 12, wherein the program codes further comprise instructions for:
modulating the rate matched sequence to obtain a modulated sequence.

14. The non-transitory computer readable medium according to claim 11, wherein the processor is further configured to:
scramble the N second bits with a second configuration information, to obtain a second scrambled sequence, wherein the second configuration information indicates an antenna port configured for the device for communication.

15. The non-transitory computer readable medium according to claim 14, wherein the scrambled sequence comprises: the DCI, the M first bits of the scrambled sequence, and the N second bits of the second scrambled sequence.

* * * * *